Patented Aug. 1, 1950

2,516,967

UNITED STATES PATENT OFFICE 2,516,967

PROCESS OF FORMING HYDROGEL BEADS

Mary P. Elam, Atlanta, Ga., assignor to International Minerals and Chemical Corporation, a corporation of New York No Drawing. Application March 5, 1948, Serial No. 13,331

16 Claims. (Cl. 252—448)

The present invention relates to an improved process for the formation of inorganic oxide-containing hydrogel and gel compositions. More particularly the invention relates to an improved process for the formation of inorganic oxide-containing hydrogel and gel compositions having essentially uniform particle size and shape.

The preparation of inorganic oxide gel compoositions which are useful in numerous branches of the chemical as well as other industries may be accomplished by various processes which are available to those skilled in the art. It is the prevalent practice to prepare such gel compositions by mixing appropriate quantities of aqueous solutions which contain alkali metal or alkaline earth metal salts of amphoteric metals with acidic solutions and allowing the resultant hydrosol to "set" to a hydrogel. By this means the amphoteric metals are converted to colloidal oxides and the resultant solutions containing such colloidal oxides are caused to gel by suitably regulating the pH of the final solutions, their solids content and the temperature during the gelation period. The resultant hydrogel is usually broken into particles of varying size and these particles are washed with water or dilute acidic solutions in order to remove the water soluble components. The washed particles are then dried at a suitable temperature; for example, at about 350° F. The resultant inorganic oxide gels are useful in numerous industries as catalysts, as a base for catalytically active metal oxides, and in the case of silica gel, as a desiccant. Inorganic oxide gels which contain such metals as alumina, vanadium oxide, thorium oxide, etc., find wide application in the petroleum industry as cracking catalysts or as a catalyst base for petroleum cracking operations. The preparation of inorganic oxide gels by this method invariably results in the formation of gel particles having a wide range of mesh size, and usually a high proportion of so-called "fines" is produced which must be discarded as they are inapplicable, in most cases, for the purposes intended. For example, in the petroleum cracking industry hydrocarbon gases are passed through a fixed or moving body of a catalyst of suitable particle size, and, should the catalyst body contain a substantial amount of so-called "fine" particles, these particles tend to agglomerate in various portions of the catalyst tubes thereby necessitating a shut-down of the operations in order to remedy these difficulties. In the case of silica gel these fines are also objectionable when the silica gel is employed as a desiccant due to the fact that these particles have a tendency to sift out of the containers, this being objectionable for several reasons. It has been proposed to circumvent this particular difficulty by subjecting inorganic oxide gel particles to a sizing operation, thereby eliminating both large and fine particles. Obviously such a method is quite wasteful. Another method which has been proposed to prepare gel particles of somewhat uniform size involves the use of crushed or fine particle gel which is admixed with any suitable inorganic binder, for example bentonite, the resultant mixture being then combined with water in order to form a slurry of high solids contents. This slurry is extruded through a tube or any suitable type of pelleting machine in order to form particles of rather uniform size. The particles are calcined, but must rely solely upon the binding characteristics of the particular inorganic bonding agent employed for their structural stability.

This invention is an improvement over the processes disclosed in United States patents issued to M. M. Marisic, Nos. 2,384,946; 2,385,217; 2,417,664; 2,418,232 and 2,419,272. A common feature of these patents involves the formation of inorganic oxide hydrogel globules or spheroids by injecting an inorganic oxide-containing hydrosol in the form of relatively small droplets or globules into a body of liquid which is substantially immiscible with water. The time of gelation of the hydrosol is so regulated that the hydrosol globules will gel as they pass through the water-immiscible liquid. The resultant hydrogel pellets may be washed free of the water-immiscible liquid, dried and used as a catalyst per se or as a base for other catalytically active metal oxides, usually in petroleum cracking. It has been found that when this particular process is carried out that it is essential that the hydrosol globules be introduced into the water-immiscible liquid medium in such a fashion that a sufficient distance be maintained between the hydrosol globules in order to prevent their collision which, if of sufficient force, frequently results in a merger of the respective hydrosol droplets, thereby resulting in the formation of hydrogel particles of varying size or uniformity.

It is an object of the invention to provide an improved process for the formation of inorganic oxide hydrogel particles of uniform size and shape.

It is a further object of the invention to provide an improved process for the formation of inorganic oxide hydrogel particles which may be adapted more readily to particular chemical processes.

It is a further object of the invention to provide silica gel particles which are substantially uniform in size and shape.

It is a further object of the invention to provide an improved process whereby the gelation period of inorganic oxide-containing hydrosols is considerably accelerated in comparison to the gelation time heretofore required for such hydrosols.

It is a further object of the invention to provide inorganic oxide gels substantially uniform in size and shape and having an improved structural stability thereby rendering them less susceptible to attrition.

The above objects as well as others which will become apparent upon a more complete understanding of the invention which will be hereinafter described are accomplished by preparing a hydrosol comprising at least one inorganic metal oxide and which is capable of rapid gelation, and introducing said hydrosol in the form of globules into a liquefied composition whose temperature is maintained below the boiling point of the hydrosol, said composition being substantially immiscible with water and having a melting point higher than the temperature of the hydrosol which is being introduced therein but below its boiling point. The temperature of the hydrosol globules admitted into the liquefied composition may be maintained below the temperature of said composition prior to gelation by adjusting the temperature of the hydrosol to below the melting point of the liquefied composition prior to its admission therein. The hydrosol globules are retained in the liquefied composition at least until gelation occurs. The gelled hydrosol globules are subsequently recovered from the liquefied composition and may be processed according to various methods which will be hereinafter more fully described. The "liquefied compositions" include any compound, mixture of compounds, or heterogeneous material which is substantially immiscible with water and which has a melting point higher than the temperature of the hydrosol which is being introduced therein, but having a melting point essentially below the boiling point of the hydrosol. Since this composition must be substantially immiscible with water it will preferably, but not necessarily, be organic in nature and its density may be either higher, equal to, or lower than the density of water under any prescribed operating conditions. Examples of such "liquefied compositions" will be more specifically hereinafter set forth.

The melting point of the substantially water immiscible compositions will depend upon the gelling properties of the hydrosol, which in turn depends upon several factors such as the pH of the hydrosol, its solids content, and the time and temperature required for gelation. Under normal operating conditions the melting point of the substantially water-immiscible compositions will be between about 50° and about 200° F. The temperature of the liquefied composition and the temperature of the hydrosol globules as they enter said composition are so regulated that a solid coating forms on the surface of the hydrosol globules as they enter the liquefied composition and gelation of the hydrosol globules will occur prior to the melting or removal of said solid coating.

Subsequent to the gelation of the hydrosol globules, the resultant hydrogel particles are recovered from the gelation medium and may be washed with an organic solvent in order to remove any residual coating thereon, or may be directly washed with water whose temperature is above the melting point of the gel medium. The latter type of washing operation removes not only any residual coating but also accomplishes the removal of water soluble inorganic salts which are objectionable in any finished gel product. The washed hydrogel particles may be subjected to treatment with a salt of a catalytically active metal in order to produce catalytic masses, or may be dried directly under suitable conditions and the dried product used for various purposes depending upon the particular inorganic oxide constituents, for example, as desiccants, water softening agents, and catalysts in the petroleum industry in such processes as cracking, hydrogenation, hydroforming, etc. The gel particles are consistently of uniform size and shape and have an improved structural stability which renders them particularly useful in the previously mentioned processes due to the fact that their exterior surfaces are smooth and hard and are quite resistant to abrasion and attrition.

The above mentioned process of forming hydrogel or gel pellets involves the preliminary preparation of a hydrosol comprising at least one inorganic metal oxide, and which is prepared under such conditions that the hydrosol will gel rather rapidly. These hydrosols may be prepared by mixing together appropriate amounts of solutions containing alkali metal or alkaline earth metal salts of amphoteric metal with acidic solutions containing mineral acids or acidic salts, preferably to give a hydrosol which has a pH less than about 8.0. It is essential that the hydrosol gel rather rapidly when in contact with the liquefied substantially water-immiscible compositions which are an integral part of the invention, and the hydrosols are prepared with this factor in view by appropriately regulating several critical factors, namely the pH of the hydrosol, the solids content of the hydrosol, and the time and temperature required for gelation. The time of gelation is directly dependent upon the temperature at which the hydrosol is maintained, and one method of rapidly gelling the hydrosol globules is by either preheating the hydrosol prior to its admission into a liquefied gelling medium whose melting point is above the temperature of the heated hydrosol, or by heating the gelling medium by any suitable means, for example by means of a heat exchanger which surrounds the gelling medium or by means of tubes that pass through the gelling medium and which contain suitable heat exchange material. For example, a column of liquefied gelling medium may be surrounded by a jacket through which is circulated steam, hot water or other suitable heat exchange media, or alternatively these heat exchange media may be circulated through tubes or pipes which traverse the interior of the chamber containing the gelling medium. Another method of regulating the gelation time of the hydrosol is by suitable pH adjustment. It is recognized that the gelation time of inorganic oxide-containing hydrosols increases as the pH decreases, and in order to achieve rapid gelation of the hydrosol particles it is preferable to maintain the pH of the hydrosol between about 8.0 and about 5.0. However, it is not intended to limit the invention to hydrosols having a pH within this limited range, since by carrying out the invention by regulating other factors this pH range may be somewhat broadened. The time of gelation of inorganic oxide-containing hydrosols is also dependent upon the solids content of the hydrosol, the gelation time decreasing with increasing solids content. It is therefore preferable, but not essential, to carry out the instant novel process by employing hydrosols which have a fairly high solids content, for example between about 5.0 and about 25.0% by weight.

It has now been found that the gelation of the inorganic oxide-containing hydrosols which contain silica may also be accelerated by incorporating therein at least one water soluble inorganic fluorine-containing compound in an amount equivalent to between about 0.1 and about 1.5 parts of fluorine per 100 parts of hydrosol. It has been found that the addition of this critical amount of inorganic fluorine-containing compound to an inorganic oxide-containing hydrosol containing a substantial amount of silica will permit gelation of the hydrosol from 2 to 5 times more rapidly than is possible for gelation of such hydrosols in the absence of such fluorine-containing compounds. It has been found that any of the water soluble inorganic fluorides are useful for this purpose, for example fluorides of sodium, potassium, ammonia, tin, aluminum, vanadium, zinc, silver, copper, etc. Acid fluoride salts of the aforementioned inorganic fluorides as well as others may be employed, for example such compounds as $NaHF_2$, $KHF_2$, $NH_4HF_2$. Water soluble fluosilicates are also useful, for example such compounds as $(NH_4)_2SiF_6$, $Na_2SiF_6$, $K_2SiF_6$, $MgSiF_6 \cdot 6H_2O$, $MnSiF_6 \cdot 6H_2O$ and

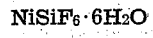

$NiSiF_6 \cdot 6H_2O$

Water soluble fluorine-containing compounds which decompose slowly or rapidly in water may be employed, for example such compounds as $WF_6$, $SnF_4$, $TiF_4$ and $TiF_3$. These compounds slowly liberate the metal constituent as the oxide and also hydrofluoric acid, the latter acting as the gelation catalyst. Fluorine-containing inorganic acids in the previously described critical amount are also useful for the purpose intended, for example hydrofluoric and fluosilicic acids. These fluorine-containing compounds may be removed from the hydrogel globules subsequent to their recovery from the liquefied gelling media by means of the washing procedures described herein. Any of the inorganic fluorine-containing compounds mentioned, or mixtures thereof, may be incorporated into the inorganic oxide-containing hydrosols according to several different methods, for example by the addition of at least one of these inorganic fluorine-containing compounds, in the previously stated amounts, to the hydrosol prior to its admission into the gelation medium, or by adding said compounds to the acidic solution which is added to the normally alkaline solution containing the alkali metal or alkaline earth metal salts of amphoteric metal which will become an integral part of the resultant hydrosol and subsequently adding the resultant acidic solution to said metal-containing alkaline solution.

The invention is applicable to the preparation of inorganic oxide hydrosols or gels from any hydrosol comprising at least one inorganic oxide. As examples of the hydrogels which may be prepared by carrying out the instant novel process may be listed hydrosols whose solids consist of silica, silica-alumina, aluminum hydroxide, ferric oxide, magnesium oxide or hydroxide, titanium oxide, tin oxide, beryllium oxide, etc., and mixtures of such materials. Hydrogel pellets whose solids comprise a major portion of silica and a minor portion of at least one other metal compound which may be thermally decomposed to form a substantially water-insoluble metal oxide having catalytic properties may also be advantageously produced by employing this process. Preferably the solids of the siliceous hydrosol will contain more than 50% by weight of silica, more commonly between about 75 and 99% of silica. The preferable concentrations of metal oxides other than silica in the hydrosol will be between about 20 and about 1.0% by weight based on the solids content of the hydrosol. Compounds of such metals as iron, aluminum, chromium, thorium, copper, cobalt, nickel, zirconium, molybdenum, tungsten, manganese, vanadium, zinc, cadmium, magnesium or other desirable metal compounds may be present in the hydrosol in the form of either water soluble or water insoluble compounds and the resultant hydrogel particles may be dried and calcined in any oxygen-containing atmosphere resulting in the conversion of the metal compounds into their respective metal oxides. Alternately the metal compound-containing siliceous hydrogel particles may be heated in a reducing atmosphere, for example in the presence of hydrogen, carbon monoxide, carbon, etc., in order to produce silica gel pellets containing the aforementioned metals in a finely divided state. Such catalytic pellets are useful in various hydrogenation processes, particularly in the petroleum and vegetable oil industries. If desired, a silica-containing hydrogel pellet produced by employing the instant novel process may be treated subsequent to its recovery from the gelation medium with an aqueous solution or suspension of the previously mentioned metal compounds and the treated hydrogel pellets subjected to the operations previously described. The addition of inorganic fluorine-containing compound to the silica-containing hydrosol, prior to its admission into the gelation medium, results in an advantageous decrease in the gelation time normally required for such hydrosols.

The hydrosols comprising at least one inorganic metal oxide may be prepared by methods which are familiar to those skilled in the art, for example by admixing solutions containing a water soluble salt of the particular metal whose oxide will comprise the hydrosol, usually under alkaline conditions, with an acidic solution containing a mineral acid or an acidic metal salt which may become an integral part of the resulting gel composition or other suitable acidic solutions. The pH of the hydrosol is regulated as previously herein described in order to take advantage of inherent gelation properties of any particular hydrosol. The hydrosol is then introduced in the form of globules into a liquefied composition of the type herein described whose temperature is maintained below the boiling point of the hydrosol, said composition being substantially immiscible with water and having a melting point higher than the temperature of the hydrosol but below its boiling point.

It is an essential feature of the instant novel process that the hydrosol globules which enter the liquefied gelling medium be at a temperature sufficiently below the melting point of the gelling medium so that each hydrosol globule becomes covered with a solid coating of the water-immiscible liquefied medium due to the temperature differential between the hydrosol and the said medium. This prevents the merger and deformation of any hydrosol globules and results in a more uniform final product. It is also essential that the solid coating remain on the hydrosol globule until gelation occurs for the reasons which will be hereinafter set forth. For example, should the solid coating be removed prior to the gelation of the hydrosol globule merger of some of the ungelled globules will occur. Furthermore, in the event that relatively high temperatures of gelation should be employed, for example between about 190° and about 210° F., it has been found that the tendency for water to escape from the hydrogel or hydrogel globules is quite pronounced. This escape of water vapor from globules coated with an oily film results in the formation of localized pressure areas in the interior of the hydrosol globules and escape of vapors from the globule thereby setting up certain stresses which result in minute fissures and centers of impaired strength in the final gel product. By employing the instant novel process the escape of water vapor from the hydrosol globules at such high gelation temperatures is prevented by the presence of the solid coating surrounding the globules prior to the gelation period. Therefore, should it be necessary to cause the gelation of any particular hydrosol at elevated temperatures, the products obtained by employing the instant novel process will have approximately equal mechanical strength as well as other valuable characteristics when compared with gels produced by prior methods.

As previously mentioned herein, the inorganic oxide hydrosol globules are maintained at a temperature below the melting point of the liquefied gelling medium in order to cause the formation of a solid coating around each individual hydrosol globule which is to remain substantially intact at least until gelation of the globule occurs. This may be accomplished by adjusting the temperature of the hydrosol, which may or may not contain at least one inorganic fluoride, in the previously stated amounts, to a temperature sufficiently below that of the melting point of the gelation medium prior to its admission therein. It will be obvious that in the case of gelation media which have a relatively low melting point, for example between about 50° and about 100° F., that should such media be heated to elevated temperatures, for example between about 125° to about 200° F., the temperature of the hydrosol must of necessity be lowered to a point considerably below that of the melting point of the gelation medium in order to accomplish the desired results. In such cases it would be advantageous to provide a hydrosol which will gel in the least possible time. This may be readily accomplished by incorporating therein at least one of the previously mentioned inorganic fluorides.

It is preferable to conduct the instant novel process by introducing the hydrosol in the form of globules into a water-immiscible liquefied composition whose temperature is maintained slightly above its melting point, but below the boiling point of the hydrosol. By maintaining the gelation medium slightly above its melting point, for example between about 5° and about 25° F. above the melting point, it will not be necessary to reduce the temperature of the entering hydrosol to such extremes, but a hydrosol temperature adjustment to slightly below the melting point of said medium, preferably at least 25° F. below the melting of the particular liquefied composition employed, may be well adapted to the process. It will be preferable to employ a substantially water-immiscible composition having a melting point between about 100° and about 200° F. which is maintained at a temperature of about 25° F. above its melting point, and adjusting the entering hydrosol to a temperature at least 25° F. below the melting point of any particular liquefied composition prior to its admission therein.

The nature of the substantially water-immiscible compositions which are an integral part of the instant novel process is only limited by the melting point range which has been previously herein set forth. Since certain hydrosols may be prepared which will gel quite rapidly at low temperatures, for example between about 30° F. and about 75° F., it will be obvious that a composition having a melting point slightly above the particular temperature at which the hydrosol will gel, and which is maintained in a liquid condition at a temperature slightly above its melting point, will be applicable as a gelling medium for such hydrosols, although gelation media having higher melting points may also be employed. The limitation at the higher melting point range is dependent only upon the boiling point of a particular hydrosol. Since in most cases the boiling point of an inorganic oxide-containing hydrosol is approximately that of water or slightly higher, any water-immiscible composition which has a melting point below the boiling point of the hydrosol is within the scope of the invention. A partial list of the water-immiscible compositions which are applicable as gelation media in the instant novel process will include such organic acids as myristic, palmitic, stearic, etc.; alcohols such as cetyl, piperonyl; aldehydes such as phthalaldehyde, vanillin, beta-naphthaldehyde; esters such as methyloxalate, phenyl benzoate, phenylphthalate, beta-naphthyl acetate, glyceryl tristearate; ethers such as diethyl and dimethyl ethers, methyl beta-naphthyl ether, di-naphthyl ether (alpha, beta); halogenated derivatives of aromatic hydrocarbons such as para-dichlorobenzene, beta-chloronaphthalene, 1,3,5-trichlorobenzene; hydrocarbons such as biphenyl, durene, naphthalene, dibenzyl, beta-methylnaphthalene, acenaphthene, paraffin wax preferably having a melting point between about 120° and about 180° F.; ketones such as benzophenone, fluorenone; nitriles such as beta-naphthonitrile; nitro compounds such as 2,4-dinitrochlorobenzene, para-nitrotoluene, and alphanitronaphthalene. Phenols such as hydroquinone, 2,4-dichlorophenol and thymol are also applicable to the process. Any of the previously mentioned materials as well as others having a melting point which renders them adaptable to the instant novel process may be employed individually or mixtures thereof which are compatible, provided that the mixtures have the required melting point. Organo-inorganic materials such as triphenyl phosphate, natural waxes such as carnauba and beeswax as well as mixtures thereof, synthetic waxes, and fats such as lanolin and hydrogenated triglyceride oils may also be used, providing that they have the required range of melting point. Natural and synthetic resins which melt between about 100° and about 200° F., for example manila, copal, estergums, rosin, coumarone-indene, asphalts and mixtures of these materials may also be employed. In the event that any of the applicable materials has an excessively high vapor pressure under the process conditions obtaining, it is advantageous to conduct the gelation of the hydrosol globules therein in an enclosed chamber, thereby preventing the losses of the gelation medium and the presence of noxious vapors in the surrounding atmosphere.

In a preferred embodiment of the invention, a silica hydrosol prepared by mixing appropriate amounts of sodium silicate and sulphuric acid to give a silica hydrosol containing between about 10 and about 15% by weight of silica and also containing ammonium fluoride in an amount equivalent to between about 0.1 and about 1.5 parts of fluorine per 100 parts of hydrosol is introduced, in globular form, into the top of a column of a liquefied water immiscible composition, for example paraffin wax having a melting point of about 120° F. and which is maintained at a temperature of about 140° F. by means of warm water circulated through a jacket surrounding the column of liquefied paraffin. The column of liquefied paraffin is between about 6 and about 10 feet in height and overlies a moving stream of water which is maintained at a temperature at least above 120° F., and preferably at a temperature approximating the temperature of the overlying liquefied paraffin. The hydrosol is introduced at the top of the column in the form of globules, this being accomplished by any of several appropriate methods, for example by flowing the hydrosol in a stream over the apex of a conical body, the latter being manufactured from a water repellant composition and which contains a plurality of grooves or ribs along which the hydrosol may flow. The resultant fine streams of hydrosol are broken up into globules as they strike the surface of the liquefied gelation medium. Alternatively the hydrosol may be introduced into the gelation medium beneath its surface by means of nozzles or other devices which will eject the hydrosol in the form of globules having a desired diameter. The hydrosol globules become coated with solid paraffin and gelation occurs before the globules traverse the distance of the column of paraffin and reach the underlying body of water. The moving body of water entrains the hydrogel globules which may be recovered therefrom by a suitable screening operation. In the event that residual paraffin remains on the surface of the hydrogel globules it may be removed by a washing operation employing either water at a temperature of about 150° F. or an organic solvent such as benzene, naphtha or acetone. The paraffin-free hydrogel globules are washed with water, preferably at a pH between about 3.5 and about 5.0, for a suitable period of time, for example between about 4 and about 24 hours, in order to remove inorganic salts which would be objectionable in the final gel product. The washed globules may then be dried under suitable conditions to remove substantially all of the water contained therein. The resultant silica gel particles are considerably more resistant to attrition than gel particles which have been prepared by previous methods.

In a further embodiment of the invention a water immiscible material which has a specific gravity greater than that of water under the process conditions obtaining is placed in a tall container and is maintained in a liquefied condition by any of the methods previously herein described. A liquid column having a depth between about 5 and about 12 feet is employed in combination with an overlying body of water which is kept in motion by circulating the same across the surface of the gelation medium. The stream of water is maintained at a temperature at least above the melting point of the liquefied composition, and serves to entrain the hydrogel globules whereby they are removed for subsequent treatments. As examples of suitable compositions which have a specific gravity greater than water may be mentioned para-dibromobenzene and triphenylphosphate.

In either of the above embodiments of the invention the gelation medium is maintained in a liquid state at a temperature not in excess of 25° F. above its melting point by any of the methods previously herein described, and an inorganic oxide-hydrosol, preferably containing a small amount of water soluble inorganic fluorine-containing compound in the previously mentioned concentrations in the event that the hydrosol contains silica, is introduced into the column of the liquefied composition in globular form. The temperature of the hydrosol is adjusted to below that of the melting point of the liquefied composition, preferably at least 25° F. below the melting point of said composition, prior to its admission therein. The hydrosol globules become coated with a solid film of said composition which remains thereon at least until gelation of the hydrosol occurs. The hydrogel particles pass through the gelation medium into the circulating stream of water and are thence removed in order to remove any residual water immiscible material which may remain on the particles and also to remove water soluble salts which may be objectionable in the final gel product.

The above modifications of the invention illustrate a continuous method of operation of the instant novel process. However, the invention is not restricted to such an operation, but alternatively and batchwise, an inorganic oxide-containing hydrosol may be suitably injected into a liquefied water-immiscible composition of the type herein described, said liquefied composition not necessarily being placed in a tall column. A rather shallow body of said liquefied composition may be employed and the hydrosol globules permitted to remain therein, either in a static condition or being moved about therein by any suitable means of agitation, at least until gelation occurs.

A suitable diameter for the final gel particles is between about 3 and about 10 mm. and the diameter of the hydrosol globules is regulated accordingly as they are admitted into the liquefied gelation media. However, the invention is not necessarily limited to the production of gel particles of such prescribed diameters and this may be modified according to the particular product desired.

In order to afford a more complete description of the invention, but not intending to be limited thereby, the following examples are set forth:

*Example I*

A silica hydrosol containing about 60% excess of sulphuric acid and about 11.2% silica is prepared by admixing a solution of water glass (sodium silicate) of about 25.6 Bé. and a solution of sulphuric acid of about 22.6 Bé., the water glass being added to the acid solution with continuous stirring. The temperature of the resultant hydrosol is about 80° F. An ammonium fluoride solution containing about 0.126 g. of said compound per cc. of solution is added to the hydrosol in a ratio of about 0.05 g. of fluorine to about 25 ccs. of hydrosol. The resultant solution is extruded, at a temperature between about 60° and about 100° F., into an eight-foot column of molten paraffin which has a melting point between about 140° and about 160° F. The temperature of the liquefied paraffin is maintained not higher than 25° F. above its melting point. The column of paraffin overlies a circulating body of water about one foot deep which is maintained at least above the melting point of the paraffin, preferably at about 150° F. The hydrosol globules gel while coated with a solid film of paraffin which melts from around each globule as it falls through the column. The resultant gelled hydrosol particles pass into the underlying circulating body of warm water wherein the paraffin is substantially removed therefrom by a leaching effect. The hydrogel particles entrained in the circulating stream of warm water are removed onto a continuously moving screen which passes through a dilute aqueous solution of sulphuric acid preferably maintained at a pH of about 4.2. This washing operation is conducted for about 8 hours. The washed hydrogel particles are dried at a temperature of about 350° F. for a period of about 4 hours, preferably in an atmosphere containing moisture in excess of the amount which leaves the hydrogel particles. The dried product is screened and has the following analysis:

|  | Per cent |
|---|---|
| −4+6 mesh | 1.9 |
| −6+12 mesh | 86.3 |
| −12+18 mesh | 8.0 |
| −18+20 mesh | 1.7 |
| −20 mesh | 2.1 |

The above analysis indicates that about 95% of the product has a mesh size between −6 and −18 thereby exemplifying the marked uniformity and high yield of product of this particular particle size.

*Example II*

A silica hydrosol which contains ammonium fluoride is prepared as in Example I, and is introduced in globular form, at a temperature of about 80° F., into the top of an eight-foot column of liquefied beeswax which has a melting point of about 140° F., and which is maintained in a liquefied condition at a temperature of about 150° F. The hydrosol globules are coated with a solid film of wax thus maintaining the globule in a spherical shape until gelation occurs. The resultant hydrogel globules are recovered from an underlying sluicing stream of water which is maintained at a temperature above 140° F., preferably at about 160° F., by a suitable screening operation. The final traces of beeswax may be removed from the hydrogel particles by washing with acetone or other wax solvents. The subsequent operations are substantially the same as described in Example I. The gel pellets have the following approximate screen analysis:

|  | Per cent |
|---|---|
| −4+6 mesh | 0.5 |
| −6+12 mesh | 94.5 |
| −12+20 mesh | 2.0 |
| −20 mesh | 2.2 |

This further illustrates the uniformity of product made possible by employing the novel process.

The gel pellets produced in accordance with the processes set forth in the above examples conform with government specifications in United States Bulletin No. JAN 169 which prescribes the requirements for silica gel desiccant insofar as density, adsorptive capacity and other physical properties are concerned.

While the above examples describe the production of silica gel under certain prescribed conditions, it is to be understood that any of the previously herein mentioned inorganic oxide gel products may be produced by carrying out the instant novel process by employing obvious extensions or modifications of the factors recited. The invention is limited only by the scope of the appended claims.

Having thus described the nature and character of the invention what is desired to be secured by Letters Patent is:

1. In the process of forming inorganic oxide hydrogel pellets from a hydrosol comprising at least one inorganic metal oxide, said hydrosol being capable of rapid gelation, the improvements comprising introducing said hydrosol in the form of globules into a liquefied composition whose temperature is maintained below the boiling point of said hydrosol, said composition being substantially immiscible with water and having a melting point higher than the temperature of the hydrosol but below its boiling point, adjusting the temperature of the hydrosol to below the melting point of said liquefied composition prior to its admission therein, retaining the globules in said composition at least until gelation occurs, and separating the gelled globules therefrom.

2. In the process of forming inorganic oxide hydrogel pellets from a hydrosol comprising silica and at least one other inorganic metal oxide, the improvements comprising incorporating into said hydrosol at least one water soluble inorganic fluorine-containing compound in an amount equivalent to between about 0.1 and about 1.5 parts of fluorine per 100 parts of hydrosol, introducing the resultant solution in the form of globules into a liquefied composition whose temperature is maintained below the boiling point of said solution, said composition being substantially immiscible with water and having a melting point higher than the temperature of said solution but below its boiling point, adjusting the temperature of said solution to below the melting point of said liquefied composition prior to its admission therein, retaining the globules in said composition at least until gelation occurs and separating the gelled globules therefrom.

3. In the process of forming hydrogel pellets from a siliceous hydrosol which is capable of rapid gelation, the improvements comprising introducing said hydrosol in the form of globules into a liquefied composition whose temperature is maintained below the boiling point of said hydrosol, said composition being substantially immiscible with water and having a melting point higher than the temperature of the hydrosol but below its boiling point, adjusting the temperature of the hydrosol to below the melting point of said liquefied composition prior to its admission therein, retaining the globules in said composition at least until gelation occurs and separating the gelled globules therefrom.

4. In the process of forming hydrogel pellets from a siliceous hydrosol, the improvements comprising incorporating into said hydrosol at least one water soluble inorganic fluorine-containing compound in an amount equivalent to between about 0.1 and about 1.5 parts of fluorine per 100 parts of hydrosol, introducing the resultant solution in the form of globules into a liquefied composition whose temperature is maintained below the boiling point of said solution, said composition being substantially immiscible with water and having a melting point higher than the temperature of said solution but below its boiling point, adjusting the temperature of said solution to below the melting point of said liquefied composition prior to its admission therein, retaining the globules in said composition at least until gelation occurs and separating the gelled globules therefrom.

5. In the process of forming inorganic oxide hydrogel pellets from a hydrosol comprising at least one inorganic metal oxide, said hydrosol being capable of rapid gelation, the improvements comprising introducing said hydrosol in the form of globules into a liquefied composition whose temperature is maintained below the boiling point of said hydrosol, said composition being substantially immiscible with water and having a melting point higher than the temperature of the hydrosol but below its boiling point, maintaining the temperature of the hydrosol in said liquefied composition below the melting point of said composition at least until gelation of the resultant solid-coated hydrosol occurs, and separating the gelled globules from said liquefied composition.

6. In the process of forming inorganic oxide hydrogel pellets from a hydrosol comprising silica and at least one other inorganic metal oxide, the improvements comprising incorporating into said hydrosol at least one water soluble inorganic fluorine-containing compound in an amount equivalent to between about 0.1 and about 1.5 parts of fluorine per 100 parts of hydrosol, introducing the resultant solution in the form of globules into a liquefied composition whose temperature is maintained below the boiling point of said solution, said composition being substantially immiscible with water and having a melting point higher than the temperature of said solution but below its boiling point, maintaining the temperature of the solution in said liquefied compostion below the melting point of said composition at least until gelation of the resultant solid-coated globules occurs, and separating the gelled globules from said liquefied composition.

7. In the process of forming hydrogel pellets from a predominantly siliceous hydrosol whose solids comprise a major portion of silica and a minor portion of at least one metal compound which may be thermally decomposed to form a substantially water insoluble metal oxide, said hydrosol being capable of rapid gelation, the improvements comprising introducing said hydrosol in the form of globules into a liquefied composition whose temperature is maintained below the boiling point of said hydrosol, said composition being substantially immiscible with water and having a melting point higher than the temperature of the hydrosol but below its boiling point, maintaining the temperature of the hydrosol in said liquefied composition below the melting point of said composition at least until gelation of the resultant solid-coated hydrosol occurs, and separating the gelled globules from said liquefied composition.

8. In the process of forming hydrogel pellets from a predominantly siliceous hydrosol whose solids comprise a major portion of silica and a minor portion of at least one metal compound which may be thermally decomposed to form a substantially water insoluble metal oxide, said hydrosol being capable of rapid gelation, the improvements comprising incorporating into said hydrosol at least one water soluble inorganic fluorine-containing compound in an amount equivalent to between about 0.1 and about 1.5 parts of fluorine per 100 parts of hydrosol, introducing the resultant solution in the form of globules into a liquefied composition whose temperature is maintained below the boiling point of said solution, said composition being substantially immiscible with water and having a melting point higher than the temperature of said solution but below its boiling point, maintaining the temperature of the solution in said liquefied composition below the melting point of said composition at least until gelation of the resultant solid-coated globules occurs, and separating the gelled globules from said liquefied composition.

9. In the process of forming hydrogel pellets from a silica hydrosol which is capable of rapid gelation, the improvements comprising introducing said hydrosol in the form of globules into a liquefied composition whose temperature is maintained below the boiling point of said hydrosol, said composition being substantially immiscible with water and having a melting point higher than the temperature of the hydrosol but below its boiling point, maintaining the temperature of the hydrosol in said liquefied composition below the melting point of said composition at least until gelation of the resultant solid-coated hydrosol occurs, and separating the gelled globules from said liquefied composition.

10. In the process of forming hydrogel pellets from a silica hydrosol, the improvements comprising incorporating into said hydrosol at least one water soluble inorganic fluorine-containing compound in an amount equivalent to between about 0.1 and about 1.5 parts of fluorine per 100 parts of hydrosol, introducing the resultant solution in the form of globules into a liquefied composition whose temperature is maintained below the boiling point of said solution, said composition being substantially immiscible with water and having a melting point higher than the temperature of said solution but below its boiling point, maintaining the temperature of the solution in said liquefied composition below the melting point of said composition at least until gelation of the resultant solid-coated globules occurs, and separating the gelled globules from said liquefied composition.

11. In the process of forming inorganic oxide hydrogel pellets from a hydrosol comprising at least one inorganic metal oxide, said hydrosol being capable of rapid gelation, the improvements comprising introducing said hydrosol in the form of globules into a liquefied composition whose temperature is maintained at slightly above its melting point but below the boiling point of the hydrosol, said composition being substantially immiscible with water and having a melting point between about 100° and about 200° F., adjusting the temperature of the hydrosol to at least 25° F. below the melting point of said liquefied composition prior to its admission therein, retaining the globules in said composition at least until gelation occurs and separating the gelled globules therefrom.

12. In the process of forming hydrogel pellets from a siliceous hydrosol, the improvements comprising incorporating into said hydrosol at least one water soluble inorganic fluorine-containing compound in an amount equivalent to between about 0.1 and about 1.5 parts of fluorine per 100 parts of hydrosol, introducing the resultant solution in the form of globules into a liquefied composition whose temperature is maintained at slightly above its melting point, but below the boiling point of said solution, said composition being substantially immiscible with water and having a melting point between about 100° and about 200° F., adjusting the temperature of the hydrosol to at least 25° F. below the boiling point of said liquefied composition prior to its admission therein, retaining the globules in said composition at least until gelation occurs and separating the gelled globules therefrom.

13. A process according to claim 12 wherein the liquefied composition employed is paraffin wax having a melting point between about 120° and about 180° F.

14. In the process of forming inorganic oxide hydrogel pellets from a hydrosol comprising at least one inorganic metal oxide, said hydrosol being capable of rapid gelation, the improvements comprising introducing said hydrosol in the form of globules into the top of a column of liquefied composition which overlies a body of water and which is substantially immiscible with water while maintaining the temperature of said composition below the boiling point of the hydrosol, said composition having a melting point higher than the temperature of the hydrosol but below its boiling point, maintaining the temperature of the hydrosol in said liquefied composition below the melting point of said composition at least until gelation occurs, and recovering the gelled globules from the underlying water.

15. In the process of forming inorganic oxide hydrogel pellets from a hydrosol comprising at least one inorganic metal oxide, said hydrosol being capable of rapid gelation, the improvements comprising introducing said hydrosol in the form of globules into the bottom of a column of a liquefied composition which underlies a body of water and which is substantially immiscible with water while maintaining the temperature of said composition below the boiling point of the hydrosol, said composition having a melting point higher than the temperature of the hydrosol but below its boiling point, maintaining the temperature of the hydrosol in said liquefied composition below the melting point of said composition at least until gelation occurs, and recovering the gelled globules from the overlying body of water.

16. The process of producing silica gel pellets, which comprises admixing a solution of water glass (25.6 Bé.) and a solution of sulphuric acid (22.6 Bé.) in such amounts as to give a silica hydrosol containing about 11.2% silica and between about 20.0 and about 60.0% excess acid over that required to neutralize the water glass, adding ammonium fluoride to the resultant hydrosol in an amount equivalent to between about 0.1 and about 1.5 parts of fluorine per 100 parts of hydrosol, extruding the resultant solution at a temperature between about 60° F. and about 100° F. into the top of a column of molten paraffin having a melting point between about 140° F. and about 160° F., maintaining the temperature of the liquefied paraffin not higher than 25° F. above its melting point, permitting the resultant hydrosol globules to drop through the paraffin at least until gelation occurs, permitting the gelled globules to pass from the liquefied paraffin into an underlying sluicing stream of water whose temperature is maintained at least above the melting point of the paraffin, recovering the hydrogel globules from said water, washing the globules with water having a pH between about 3.5 and about 5.0, and drying the washed globules.

MARY P. ELAM.

REFERENCES CITED

The following references are of record in the file of this patent:

UNITED STATES PATENTS

| Number | Name | Date |
| --- | --- | --- |
| 2,347,231 | Stoewener et al. | Apr. 25, 1944 |
| 2,384,942 | Marisic | Sept. 18, 1945 |
| 2,436,439 | Lincoln et al. | Feb. 24, 1948 |
| 2,450,394 | Brown et al. | Sept. 28, 1948 |